Figure 1:
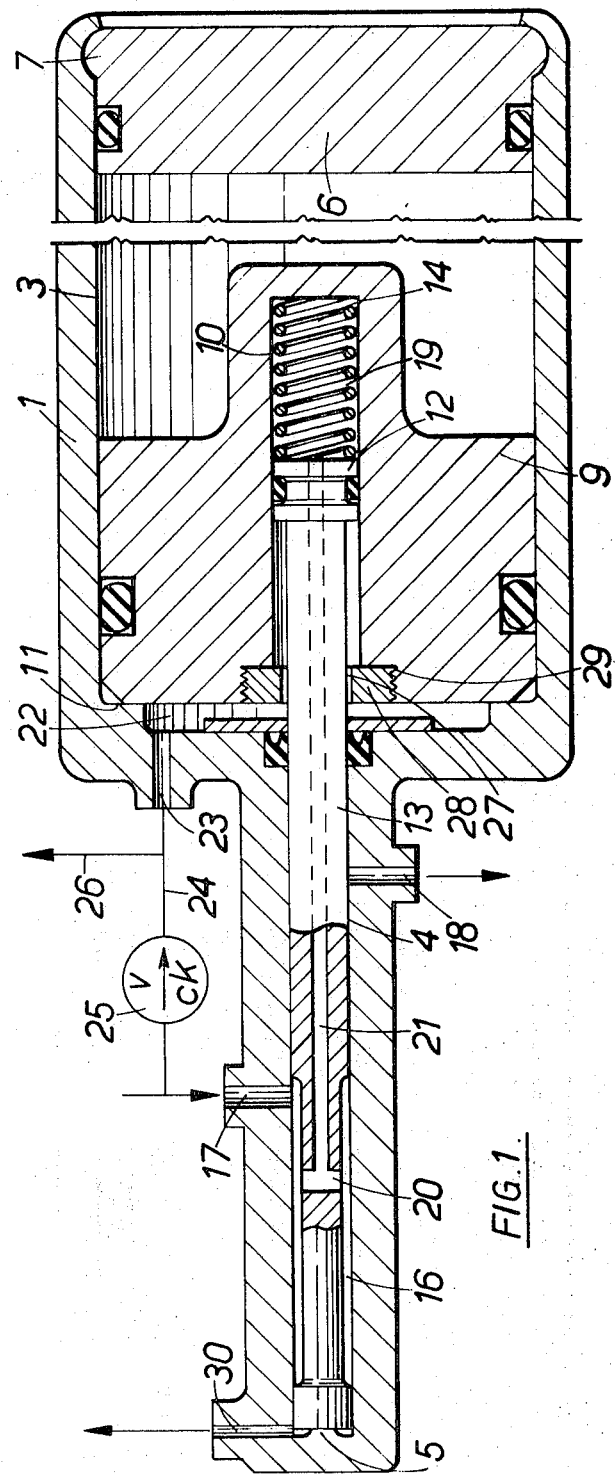

United States Patent [19]
Farr

[11] 3,837,354
[45] Sept. 24, 1974

[54] HYDRAULIC BRAKING SYSTEMS FOR VEHICLES
[75] Inventor: Glyn Philip Reginald Farr, Kenilworth, England
[73] Assignee: Girling Limited, Birmingham, England
[22] Filed: June 7, 1972
[21] Appl. No.: 260,382

[30] Foreign Application Priority Data
July 10, 1971   Great Britain ............... 32482/71
Sept. 24, 1971  Great Britain ............... 44618/71
Nov. 16, 1971   Great Britain ............... 53152/71
Feb. 28, 1972   Great Britain ............... 8459/72

[52] U.S. Cl. ............................. 137/118, 60/413
[51] Int. Cl. ................................. G05d 11/00
[58] Field of Search .......... 137/101, 115, 118, 119; 60/413, 415

[56] References Cited
UNITED STATES PATENTS

| | | | |
|---|---|---|---|
| 2,500,627 | 3/1950 | Chinn | 137/118 |
| 2,751,183 | 6/1956 | Crookston | 251/63.4 X |
| 3,165,113 | 1/1965 | Schultz | 137/101 |
| 3,334,705 | 8/1967 | Lam | 137/118 X |
| 3,396,741 | 8/1968 | Wintterlin et al | 137/115 |
| 3,575,192 | 4/1971 | MacDuff | 137/118 |
| 3,638,528 | 2/1972 | Lewis | 60/413 |
| 3,703,186 | 11/1972 | Brewer | 137/101 |

Primary Examiner—William R. Cline
Attorney, Agent, or Firm—Scrivener Parker Scrivener & Clarke

[57] ABSTRACT

A priority valve assembly for a power braking system includes a housing having a stepped cylinder bore, valve means located between an inlet and an outlet leading into the smaller diameter bore portion, and an operating member for the valve means linked to a piston working in the larger diameter bore portion, one side of the piston being resiliently loaded and the other side forming an accumulator chamber for hydraulic braking fluid. Either the valve means or the operating member is arranged to be movable relative to the piston in response to the pressure drop which occurs when the valve means open so that the valve means opens and closes at two different positions of the accumulator piston corresponding to two different accumulator pressures.

11 Claims, 5 Drawing Figures

HYDRAULIC BRAKING SYSTEMS FOR VEHICLES

This invention relates to control valve assemblies for use in hydraulic braking systems for vehicles, especially agricultural tractors, of the kind in which hydraulic fluid from a high pressure source is used for the wheel brakes.

In systems where the high pressure fluid is used for other equipment of the vehicle, for example the steering mechanism, operation of such other equipment creates a demand for fluid with the result that fluid pressure, or at least sufficient fluid pressure, may not be available to actuate the brakes.

According to our invention a control valve assembly for use in a braking system of the kind set forth comprises a housing having a bore; a piston working in the bore; means for loading one side of the piston to pressurise fluid in a chamber on the opposite side of the piston, the chamber being adapted for connection to the wheel brakes; an inlet port in the housing for connection to the high pressure source; an outlet port in the housing for connection to other vehicle equipment or a fluid reservoir; valve means within the housing for controlling the flow of fluid between inlet port and outlet port, operation of the valve means being dependent on the travel of the piston, whereby communication is established between the inlet port and outlet port only when the chamber pressure exceeds a predetermined value.

Preferably the valve means is operated by a member carried by the piston and capable of movement relative to the piston whereby communication between inlet port and outlet port is cut off when the pressure in the chamber falls below a second predetermined value lower than the first value.

The bore in the housing may be longitudinally stepped, the piston working in a bore portion of greater diameter and a rod associated with the piston being movable in a bore portion of smaller diameter to operate the valve means.

The rod may be rigid with the piston and carry a relatively movable operating member or the rod itself may have a lost motion connection with the piston.

The inlet and outlet ports may be axially spaced along the smaller bore portion and the valve means may comprise either a spring-loaded ball valve located between the ports or a valve member slidable in the bore. The chamber may be on the side of the piston remote from the piston rod or on the side adjacent the piston rod and means for connecting the chamber to the high pressure source may be external to the control valve assembly or may be included in the assembly.

In a system that does not inlcude another power operable mechanism, such as steering, the outlet port will be connected directly to a reservoir for the high pressure source.

Figure 2:
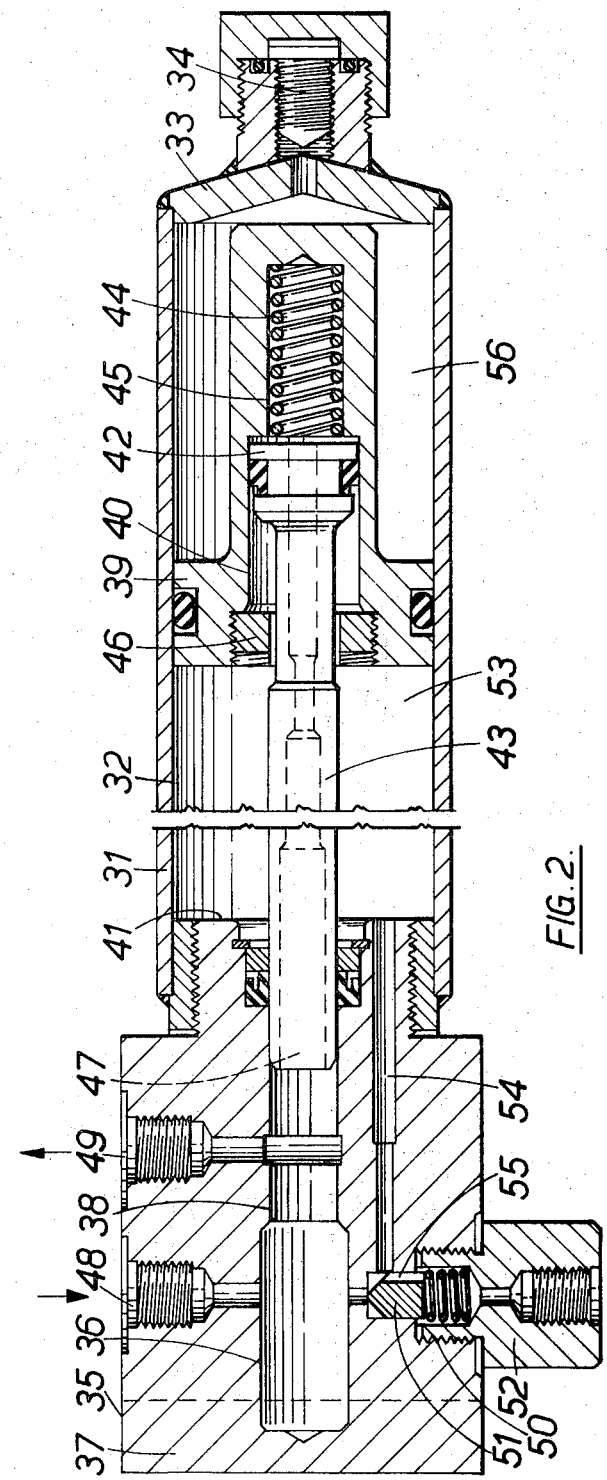
Figure 3:
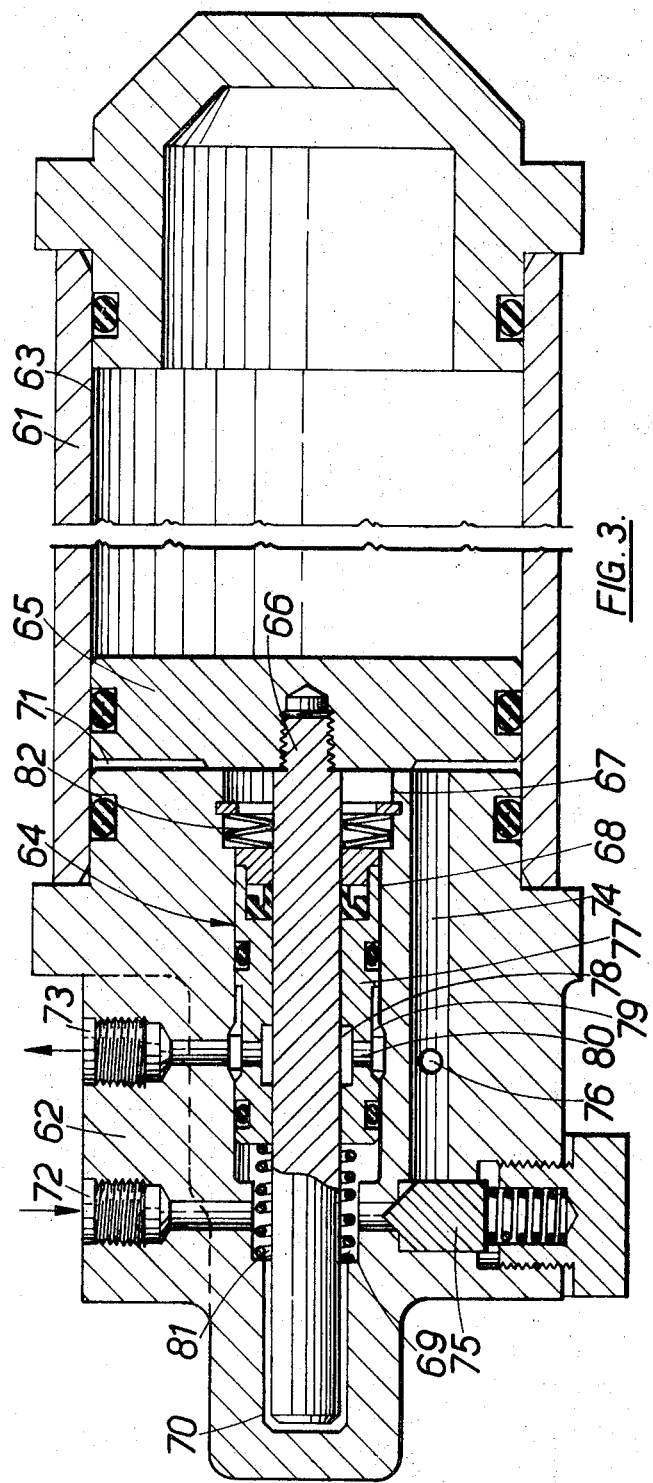
Figure 4:
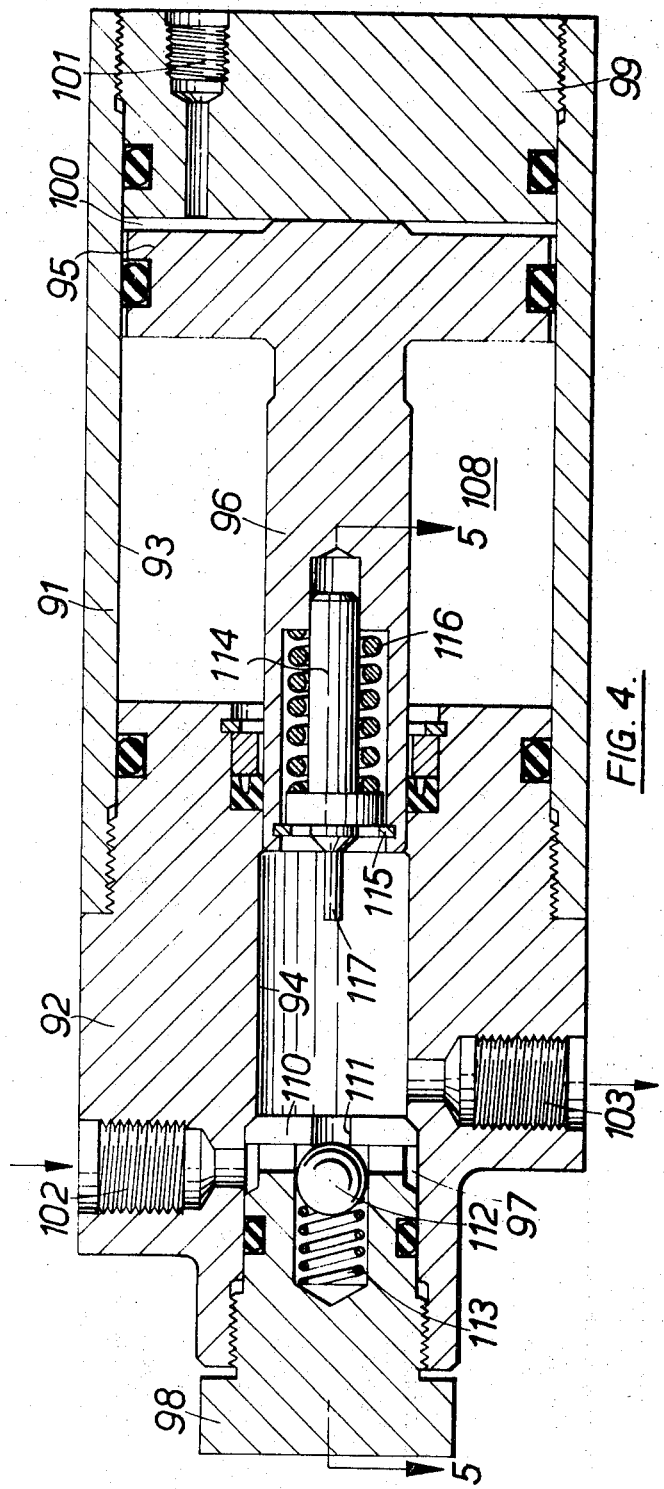
Figure 5:
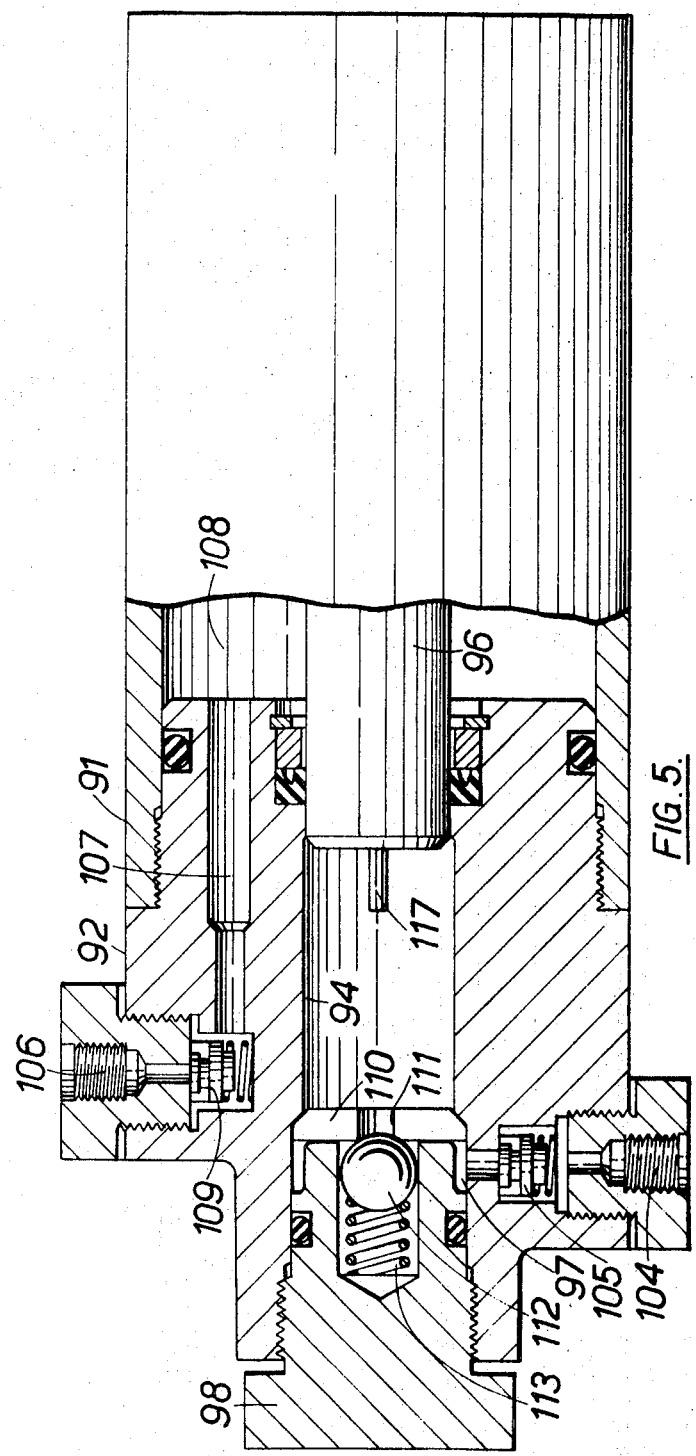

Four embodiments of the present invention are illustrated, as examples, in the accompanying drawings in which:

FIG. 1 is a longitudinal section through a control valve assembly for use in an hydraulic braking system of an agricultural tractor, FIG. 2 is a longitudinal section through a second embodiment of the assembly, FIG. 3 is a longitudinal section through a third embodiment, FIG. 4 is a longitudinal section through a fourth embodiment, and FIG. 5 is a section on the lines 5—5 of FIG. 4.

The control valve assembly illustrated in FIG. 1 comprises a housing 1 provided with a longitudinally extending stepped bore including a portion 3 of greater diameter, and a portion 4 of smaller diameter. The outer end of the bore portion 4 is closed by an integral end wall 5, and the outer end of the bore portion 3 is closed by a plug 6 provided with a raised peripheral bead 7 over which the free end of the wall of the housing 1 is crimped to secure the plug 6 in position.

A piston 9 works in bore portion 3 and is bored axially at 10 from the end adjacent to a shoulder 11 at the step in diameter of the bore 2, and a second piston 12 works in the bore 10. The piston 12 is carried by a piston rod 13 which works in the bore portion 4 and, in the inoperative position shown in FIG. 1 in which the piston 9 engages with the shoulder 11, the free end of the rod 13 abuts against the end wall 5 due to the loading of a compression spring 14 acting to urge the pistons 9 and 12 in opposite directions away from each other. The rod 13 is formed with an intermediate portion 16 of reduced diameter which, in the position shown, communicates with an inlet port 17. In that position an outlet port 18 is closed by the full diameter of the rod 13. The outlet port 18 is spaced from the inlet port 17 by a smaller distance than the axial length of the intermediate portion 16. Thus rod 13 constitutes a valve spool controlling the flow between ports 17 and 18.

The inlet port 17 communicates with a chamber 19 comprising the portion of the axial bore 10 in which the spring 14 is housed through a diametrical passage 20 in the intermediate portion 16 of the rod and a communicating longitudinal passage 21.

The piston 9 comprises the piston of an hydraulic accumulator defined by a chamber 22 between the piston 9 and the shoulder 11, and fluid under pressure from a high pressure pump (not shown) is admitted to the chamber 22 through a supply and return port 23. The fluid in the chamber 22 is pressurised by the application to the piston 9 of a force or pressure from a spring or other resilient cushion or bag, or a volume of gas located between the piston 9 and the plug 6.

The pump is also connected to the inlet port 17 and the ports 17 and 23 are interconnected by a pipe line 24 in which is located a one-way valve 25 which is adapted to close in a direction to prevent fluid flowing from the port 23 to the port 17. A pipe-line 26 on the downstream side of the one-way valve 25 is connected to wheel brakes of the vehicle, and the outlet port 18 is connected to a fluid pressure operable mechanism, conveniently the power steering mechanism of the vehicle.

The rod 13 works through a clearance opening 27 in a bushing 28 which is screwed into a counterbored recess 29 at the open end of the bore 10.

When the accumulator is in an uncharged or exhausted condition as shown, fluid pressure from the pump acts on the first piston 9 through the one-way valve 25, and also on the inner face of the second piston 12 through the clearance between the bushing 28 and the rod 13. The opposite face of the piston 12 is also subjected to the same pressure from the pump through the inlet port 17, and the passages 20 and 21. The pressure acting on the first piston 9 causes that piston to move away from the shoulder 11 towards the plug 6, and away from the piston 12 of which the rod 13 is urged into engagement with the end wall 5 due to a force comprising the same pressure acting over different areas of the piston 12, and the effect of the compression spring 14. This continues until the bushing 28 engages with the piston 12. Thereafter the two pistons 9 and 12 move towards the plug 6 until the rod 13 has been withdrawn from the end wall 5 by a sufficient distance for the intermediate portion 16 to be aligned with, and uncover, the outlet port 18. At this point the one-way valve closes. Fluid from the pump is then delivered to the steering mechanism, and the pressure in the chamber 19 acting on the outer end of the piston 12 is reduced. The reduction in the pressure of fluid in the chamber 19 allows the piston 12 to move towards the closed end of the bore 10 against the force in the compressed spring 14 which is compressed progressively until it becomes solid.

When the brakes are to be applied fluid under pressure is delivered to the actuators of the brake from the chamber 22. The first piston 9 then moves in the opposite direction under the influence of the force or pressure applied thereto to pressurise the fluid in the chamber 22 until the port 18 is closed by the full diameter of the rod 13. As soon as the port 18 is closed, there is an effective increase in the pump pressure which opens the one-way valve 25 to recharge the hydraulic accumulator. Furthermore equal pressures will again be applied to opposite sides of the piston 12. Thus the piston 12 will move towards the closed end of the bore 2 towards the end closure 5, with the assistance of the spring 14. The cycle of operations described above is then repeated.

It will be appreciated that when port 18 is opened, piston 9 will be nearer plug 6 than when port 18 is closed, i.e., the valve opens at one pressure in chamber 22 and closes at a second pressure, the first pressure being higher than the second.

The housing 1 is provided with a recuperation port 30 for connection to a reservoir for fluid supplying the pump. That recuperation port 30 may be omitted if the spring 14 is of sufficient strength to return the piston 12 to its inoperative initial position shown in the drawings.

Another embodiment of the valve assembly is shown in FIG. 2 and comprises a first housing part 31 having a bore 32 open at one end and closed at the other end by a wall 33 provided with a gas filler valve 34. A second housing part 35 has a stepped bore in which a portion 36 of greater diameter is closed at one end by an integral wall 37 and at the other end continues into a bore portion 38 of smaller diameter which is open-ended. The open ends of the two housing parts 31 and 35 are screwed together so that the bores 32, 36 and 38 are co-axial.

A piston 39 working in bore 32 is itself bored axially at 40 from the end adjacent to the shoulder 41 at the step in diameter between bore 32 and bore 38, and a second piston 42 works in the bore 40. The piston 42 is carried by a piston rod 43 which works in the bore portion 38 and is urged away from the first piston 39 by a compression spring 44 housed in a blind bore 45 continued from bore 40 in piston 39 but of smaller diameter. The piston rod 43 is of smaller diameter than piston 42 which is trapped in bore 40 by a bushing 46 screwed into the open end of the bore and being a clearance fit over piston rod 43. A passage 47 extends axially through the piston rod 43 connecting bores 36 and 38 with the space between pistons 39 and 42.

The housing part 35 is formed as a ported valve block with an inlet port 48 leading into bore portion 36, an outlet port 49 leading into the bore 38 and a port 50 adapted to be connected to the wheel brakes of the tractor. A spring-loaded poppet valve 51 is trapped in the port 50 by a ported plug 52, the poppet valve 51 acting as a one-way valve between the bore 36 and the port 50. The chamber 53 between piston 39 and shoulder 41 is also connected to port 50 via a passage 54 and a groove 55 in the valve 51.

The housing part 31 serves as an hydraulic accumulator in which fluid in chamber 53 is pressurised by a volume of gas in the space 56 between piston 39 and wall 33. A spring or resilient cushion or bag may be used instead of gas.

When the accumulator is in the fully charged condition as shown in the drawing and the brakes are applied, fluid passes from chamber 53 to port 50 causing the piston 39 to move to the left, towards shoulder 41. Movement of piston 39 carries piston 42 and piston rod 43 to the left closing outlet port 49. This can be arranged to occur when the pressure in chamber 53 is, say, 1,000 p.s.i.

Once the outlet port 49 is closed the pump pressure rises to accumulator pressure and, by means of the bore 47, the pressures on both faces of piston 42 equalise. Under the influence of the spring 44 piston rod 43 moves to the left until piston 42 abuts bushing 46. Piston rod 43 cannot close inlet port 48 since the diameter of bore 36 is larger than the diameter of the rod.

Further increase in pump pressure causes piston 39 to move the right taking piston 42 and rod 43 with it, until the outlet port 49 is opened at a pressure of, for example, 1,500 p.s.i. At this point non-return valve 51 will close as the pressure in bore 36 drops and the pressure on the larger face of piston 42 drops. Thus piston 42 will move to the right as the accumulator pressure over the differential area overcomes the spring 44 and the accumulator/valve assembly will return to the fully charged condition shown in the drawing.

Thus hydraulic fluid under pressure at port 50 is always available for actuating the brakes, but hydraulic fluid at the outlet port 49 for actuating the steering is available only when a predetermined volume of fluid at a predetermined pressure is present in chamber 53.

The third embodiment of the control valve assembly illustrated in FIG. 3 comprises two housing parts 61 and 62 secured together so that a larger bore portion 63 in part 61 is co-axial with a smaller bore portion 64 in part 62. A piston 65 working in bore portion 63 has a piston rod 66 extending into bore portion 64 which is itself stepped and formed of four co-axial bores 67-70 of successively decreasing diameter in the direction away from piston 65. The piston 65 is biased to the left by means (not shown) to pressurise hydraulic fluid in the chamber 71.

An inlet port 72 leads into bore 69 of housing part 62 and an outlet port 73 leads into the bore 68. A passage 74 leads from chamber 71 to bore 69 via a oneway valve 75 preventing flow from chamber 71 to bore 69. A port 76 adapted to be connected to the brakes leads into passage 74 downstream of valve 75.

Valve means associated with piston rod 66 comprise a sleeve 77 slidably mounted on piston rod 66 and working in bore 68, the sleeve having an internal circumferential groove 78 and an external circumferential groove 79, the grooves being connected by angularly spaced holes 80. Seals between the sleeve 66 and bore 68 are provided on each side of groove 77 and a seal between sleeve 77 and piston rod 66 is provided on the side of groove 78 adjacent piston 65. Sleeve 77 is shorter than bore 68 and a compression spring 81 acts between one end of the sleeve and the step at the change in diameter from bore 69 to the bore 70, this step limiting the movement of sleeve 77 in the direction away from piston 65. A stack of Belleville washers 82 acting on the other end of sleeve 77 effectively limits its movement in the opposite direction.

In operation, when the chamber 71 is empty and the pump is started, fluid is forced into chamber 71 via oneway valve 75 which causes a difference in pressure between the fluid in bore 69 and chamber 71 and this causes the sleeve 77 to load against the Belleville spring washers 82 and take up the second limit position shown in the drawing. When the piston rod 66 reaches the annular groove 78 fluid is able to pressurise the steering mechanism and the pressure drops within bores 68 and 69. This causes the sleeve 77 to move to the left, urged by the Belleville washers 82, and to further open the groove 78 to fluid. The differential pressure acting on the sleeve 77 increases and it is shuttled to a first limit position against the step between bores 68 and 69.

When the brakes are used fluid is taken from chamber 71 via passage 74 and port 76 and piston 65 moves to the left until piston rod 66 closes the groove 78. When this occurs the pressure in bore 69 increases allowing spring 81 and the differential pressure across valve 65 to reposition the sleeve 77 in the second limit position.

It will be appreciated that springs 81 and 82 assist the sleeve change over from one limit position to the other, the change being mainly effected by differential pressure. In effect the valve seat is movable so that the valve opening pressure is higher than its closing pressure.

An advantage of this embodiment is that piston rod 66 can be made shorter than the equivalent rods 13 and 43 which act as spool valves and cannot be practically shortened without limiting their stroke. There are problems in machining rods of such a length.

The shaft 66 is all one diameter and can be ground easily on a centreless grinding machine. Also if machining tolerances build up during the manufacture of the housing, the dimensions of the sleeve can be suitable altered. Rarely will the housing need to be scrapped for this reason.

The fourth embodiment of the control valve assembly illustrated in FIGS. 4 and 5 comprises two tubular housing parts 91 and 92 screwed together so that a larger bore portion 93 in part 91 is co-axial with a smaller bore portion 94 in part 92. A piston 95 working in bore portion 93 has a piston rod 96 extending into bore portion 94 which is counterbored at 97 to receive a screwed plug 98. The other end of the housing part 91 is closed by a screwed end member 99 having three axially extending ports leading into the chamber 100 defined between the piston 95 and the end member 99. One port 101 is shown and the two undisclosed ports are adapted to be connected to the respective circuits of a dual brake system.

An inlet port 102 in the housing part 92 extends radially from the counterbore 97 and an outlet port 103 extends radially from smaller bore portion 94 i.e., it is axially spaced from the inlet port towards the piston 95. A third radial port 104 in the housing part 92 leads into the counterbore 97 via a non-return valve 105 and is adapted to be connected externally of the assembly to port 101 so that chamber 100 can be pressurized by fluid from the pump.

A fourth port 106 in the housing part 92 connects with an axial passage 107 leading into a second chamber 108 defined between the piston 95 and housing part 92. Port 106 is controlled by a one-way valve 109 and is adapted for connection to a source of high pressure gas to pressure chamber 108.

The plug 98 holds a plate 110 against the shoulder at the change of diameter between counterbore 97 and smaller bore 94. An axial opening 111 in the plate 110 forms a seating for a ball valve 112 loaded by a spring 113 housed in a recess in the plug 98. The valve 112 controls the flow of fluid between the inlet port 102 and outlet port 103.

A plunger 114 is retained in an axial recess in the piston rod 96 by a circlip 115 and is biassed towards the circlip 115 by a spring 116. The plunger 114 is formed with a probe 117 extending axially beyond the free end of the piston rod 96.

In its free position the assembly is as shown with chamber 108 or accumulator charged to about 600 p.s.i. When the hydraulic pump is started, hydraulic fluid is admitted to chamber 100 via port 102, counterbore 97, non-return valve 105, port 104 and port 101. When the fluid pressure reaches a predetermined value, approximately 1,500 p.s.i. probe 117 touches the ball valve 112 but is unable to unseat it because the fitted load of the spring 113 and the pressure differential across the ball are higher than the loading of spring 116. Therefore the pump continues to increase the fluid pressure in chamber 100 and to increase the loading of spring 116. At approximately 2,000 p.s.i., the loading of spring 116 exceeds the loading of 2,000 p.s.i. over the ball seal area and the loading of spring 113 so that the ball valve 112 snaps open under the action of spring 116 to allow hydraulic fluid to pass to outlet port 103 to operate the steering mechanism.

Should the brakes be applied a number of times, piston 95 will move to the right. When the pressure drop across the ball valve 112 exceeds the loading on spring 116, the valve will close again and the pump will repressurise chamber 100. The ball valve 112 closes at approximately 1,500 p.s.i.

Should the brakes be applied when the pump is running the accumulator will continue to discharge until the pressure falls to about 600 p.s.i., the pressure in chamber 108.

The advantages of this embodiment of the accumulator/valve assembly are:

1. Simple construction, requiring minimum of machining and being easy to assemble. The ball valve and plunger is particularly free from complications since no seals are involved. This allows rapid unhindered movement of the plunger 114 to "snap" open the ball valve and allow it to "snap" closed.

2. Except when the accumulator is first charged with gas, the piston is always loaded to the left since the pump pressure acts upon a larger area than the gas pressure. The one way loading on the piston seals prevents excessive wear of the seals.

We claim:

1. A control valve assembly for use in a braking system of the type which includes an accumulator connected to the braking circuit and a source of high hydraulic pressure connected through one way valve means to said accumulator, said valve assembly comprising a housing having a bore therein, a piston working in said bore, a closed pressure chamber of said accumulator being defined in said bore on one side of said piston, means for connecting said accumulator chamber to the high pressure source to pressurize said chamber, means for connecting said accumulator chamber to the braking circuit, resilient means for loading said piston in opposition to hydraulic pressure acting thereon, said piston being movable against said resilient means to a first position corresponding to a first predetermined value of fluid pressure in said accumulator chamber; inlet and outlet ports in said housing separate from said accumulator chamber for connection to said high pressure source and to other vehicle equipment, respectively, normally closed valve means within said housing for controlling the flow of fluid between said inlet and outlet ports, an operating member for said valve means having a sealed operative connection with said piston so as to be movable therewith and operate said valve means in response to movement of said piston, said operating member including means for opening said valve means to establish communication between said inlet and outlet ports when the piston is moved to its first position.

2. A control valve assembly as in claim 1 wherein said operative connection includes means enabling said valve means and said operating member to have relative movement independently of said piston, the valve means being closed by said operating member at a second position of said piston corresponding to a second predetermined value of fluid pressure in said accumulator chamber which is less than said first pre-determined value, and means responsive to differential fluid pressures in said accumulator chamber and at said inlet port for effecting said relative movement.

3. A control valve assembly as in claim 2 wherein the bore in said housing is longitudinally stepped, said piston working in a bore portion of greater diameter and said operating member including a rod associated with the piston and movable in a bore portion of smaller diameter, said rod being sealed by sealing means between it and the bore of smaller diameter.

4. A control valve assembly as in claim 3 wherein the rod is rigid with said piston and said operating member includes a part carried by said rod and movable relative thereto and a first spring biassing said part in a direction away from said piston.

5. A control valve assembly as in claim 4 wherein said inlet and outlet ports are axially spaced along the smaller bore portion and said valve means comprise a ball valve biased towards a seating located between said ports by a second spring, said operating member engaging said ball valve when said piston is at said second position but compressing said first spring as said piston moves towards said first position whereat said operating member unseats said ball valve.

6. A control valve assembly as in claim 5 wherein said accumulator chamber is on the side of said piston remote from said piston rod and is adapted to be connected to a third port in said housing leading into the smaller bore portion upstream of said ball valve.

7. A control valve assembly as in claim 4 wherein said outlet port is located in the smaller bore portion between said inlet port and said accumulator chamber, and said valve means comprise a sleeve slidable on said piston rod between first and second limited positions, said sleeve being provided with an annular groove having ardial apertures in communication with said outlet port at both of said limit positions, the ends of said sleeve being exposed to fluid pressure in said accumulator chamber and at said inlet port respectively so that when the chamber pressure exceeds the inlet pressure said sleeve is biased towards said first limit position and when the inlet pressure exceeds said chamber pressure said sleeve is biassed towards said second limit position, the piston rod clearing said groove to open said valve means when said piston is at said first position, the resultant drop in pressure at said inlet port allowing said sleeve to move from said second limit position to said first limit position so that said piston rod does not pass axially through said groove to close said valve means until said piston reaches said second position.

8. A control valve assembly as in claim 7 wherein a spring acts on each end of said sleeve.

9. A control valve assembly as in claim 3 wherein said inlet and outlet ports are axially spaced along the smaller bore portion and said accumulator chamber is on the same side of said piston rod which is carried by a second piston working in a blind bore in said first piston, an axial passage through said piston rod leading from the smaller bore portion to the space between said first and second pistons, said piston rod acting as said operating member, one end of said second piston being exposed to the pressure in said accumulator chamber and the other end being exposed to the pressure at said inlet port, said piston rod opening said valve means when said first piston is at said first position and the resultant drop in inlet pressure shortening the effective length of said piston rod so that it closes said valve means when said piston reaches said second position.

10. A control valve assembly as in claim 9 wherein said first and second pistons are urged apart by a spring.

11. A control valve assembly as in claim 3 wherein said resilient means comprise a gas filler valve in said housing through which gas is introduced into the larger bore portion on the side of said piston opposite said accumulator chamber.

* * * * *